US012173533B2

(12) United States Patent
Fuchs et al.

(10) Patent No.: US 12,173,533 B2
(45) Date of Patent: Dec. 24, 2024

(54) LOCK FOR A MOTOR VEHICLE

(71) Applicant: Kiekert AG, Heiligenhaus (DE)

(72) Inventors: Carsten Fuchs, Essen (DE); Johannes Nowak, Wesel (DE)

(73) Assignee: Kiekert AG, Heiligenhaus (DE)

( * ) Notice: Subject to any disclaimer, the term of this patent is extended or adjusted under 35 U.S.C. 154(b) by 666 days.

(21) Appl. No.: 17/260,382

(22) PCT Filed: Jun. 19, 2019

(86) PCT No.: PCT/DE2019/100568

§ 371 (c)(1), (2) Date: Jan. 14, 2021

(87) PCT Pub. No.: WO2020/007402

PCT Pub. Date: Jan. 9, 2020

(65) Prior Publication Data

US 2021/0246692 A1 Aug. 12, 2021

(30) Foreign Application Priority Data

Jul. 5, 2018 (DE) ..................... 10 2018 116 325.8

(51) Int. Cl.
*E05B 77/06* (2014.01)
*E05B 79/08* (2014.01)

(52) U.S. Cl.
CPC .............. *E05B 77/06* (2013.01); *E05B 79/08* (2013.01)

(58) Field of Classification Search
CPC ......... Y10T 292/1075; Y10T 292/1047; Y10T 292/1082; Y10T 292/85; Y10T 292/869;
(Continued)

(56) References Cited

U.S. PATENT DOCUMENTS 3,390,404 A * 6/1968 Murchison ........... B65D 50/067 439/270
4,232,890 A * 11/1980 Hoen ...................... E05C 19/14 292/114

(Continued)

FOREIGN PATENT DOCUMENTS

CA 2494674 C * 6/2011 ............. E05B 77/06
CN 103573027 A * 2/2014 ............... E05B 3/00

(Continued)

OTHER PUBLICATIONS

Espacenet machine translation, KR20090075563A, claims and description, Jul. 8, 2009 (Year: 2023).*

(Continued)

*Primary Examiner* — Christine M Mills
*Assistant Examiner* — Steven A Tullia
(74) *Attorney, Agent, or Firm* — Renner, Otto, Boisselle & Sklar, LLP

(57) ABSTRACT

A motor vehicle, in particular a side door lock, comprising a locking mechanism leaving a rotary latch and at least one locking pawl, an actuating lever chain with at least one actuating lever and a release lever, wherein a blocked locking mechanism can be unblocked by means of the release lever, and a coupling element between the actuating lever and the release lever, wherein the coupling element can be actuated by means of a mass inertia element which is mounted in the motor vehicle lock, and wherein the mass inertia element can be stored in the motor vehicle lock by means of a plastic mandrel.

18 Claims, 2 Drawing Sheets

(58) Field of Classification Search
CPC .......... E05B 77/06; E05B 79/08; E05B 77/36; E05B 77/38; E05B 79/00; E05B 79/02; E05B 85/02; E05B 15/1635; E05B 2015/1664; E05B 2015/1678; E05B 2017/0004; E05B 2017/0045; E05B 17/0004; E05B 17/0045; Y10S 292/22; Y10S 292/23; Y10S 292/38; Y10S 292/53; Y10S 292/56; Y10S 292/57; Y10S 292/58; Y10S 292/64
See application file for complete search history.

(56) References Cited

U.S. PATENT DOCUMENTS

| | | | | |
|---|---|---|---|---|
| 4,318,650 | A * | 3/1982 | LLauge | F16B 19/1072 411/43 |
| 4,904,004 | A * | 2/1990 | Bartczak | E05B 79/20 292/201 |
| 5,775,860 | A * | 7/1998 | Meyer | F16B 19/1081 411/41 |
| 6,026,705 | A * | 2/2000 | Ficyk | G05G 5/28 292/216 |
| 6,971,688 | B2 * | 12/2005 | Drysdale | E05B 77/12 292/216 |
| 7,198,307 | B2 * | 4/2007 | Drysdale | E05B 77/12 292/216 |
| 8,056,944 | B2 * | 11/2011 | Jankowski | E05B 77/06 292/201 |
| 8,961,062 | B2 * | 2/2015 | Gillis | B60N 2/75 292/183 |
| 9,523,220 | B2 * | 12/2016 | Park | E05B 85/16 |
| 9,945,164 | B2 * | 4/2018 | Perkins | E05B 77/12 |
| 9,970,221 | B2 * | 5/2018 | Rudraraju | E05B 77/06 |
| 10,352,069 | B2 * | 7/2019 | Yamane | E05B 79/08 |
| 10,655,366 | B2 * | 5/2020 | Cumbo | E05B 85/20 |
| 2002/0096892 | A1 * | 7/2002 | Sato | E05C 19/022 292/341.15 |
| 2003/0001399 | A1 * | 1/2003 | Sato | E05B 79/06 292/336.3 |
| 2004/0201238 | A1 * | 10/2004 | Griggs, Jr. | E05B 83/32 180/274 |
| 2005/0280266 | A1 * | 12/2005 | Mueller | E05B 77/42 292/336.3 |
| 2006/0261602 | A1 * | 11/2006 | Jankowski | E05B 77/12 292/216 |
| 2010/0092790 | A1 * | 4/2010 | Luo | B29C 48/337 428/457 |
| 2010/0237633 | A1 * | 9/2010 | Jankowski | E05B 77/06 292/216 |
| 2014/0167427 | A1 * | 6/2014 | Corwin | E05B 85/10 292/336.3 |
| 2015/0069767 | A1 * | 3/2015 | Nam | E05B 77/06 292/336.3 |
| 2015/0167364 | A1 * | 6/2015 | Gweon | E05B 77/06 292/200 |
| 2015/0315824 | A1 * | 11/2015 | Gotzen | E05B 85/243 292/200 |
| 2016/0130845 | A1 * | 5/2016 | Park | E05B 77/06 292/336.3 |
| 2016/0258194 | A1 * | 9/2016 | Rosales | E05B 77/06 |
| 2017/0114575 | A1 * | 4/2017 | Cumbo | E05B 77/54 |
| 2017/0152683 | A1 | 6/2017 | Nagata | |
| 2020/0173217 | A1 * | 6/2020 | Hodgson | E05F 1/16 |
| 2021/0032910 | A1 * | 2/2021 | Fuchs | E05B 77/06 |
| 2021/0076518 | A1 * | 3/2021 | Lotter | E05C 1/10 |
| 2021/0246692 | A1 * | 8/2021 | Fuchs | E05B 79/08 |
| 2022/0364392 | A1 * | 11/2022 | Wojtalla | E05B 17/0004 |

FOREIGN PATENT DOCUMENTS

| | | | | |
|---|---|---|---|---|
| CN | 103573027 | B * | 12/2015 | E05B 3/00 |
| CN | 106869634 | A * | 6/2017 | E05B 79/06 |
| CN | 108915363 | A * | 11/2018 | E05B 15/00 |
| DE | 807872 | C * | 4/1949 | F16B 19/1027 |
| DE | 102004001988 | A1 | 8/2005 | |
| DE | 102008005575 | A1 | 8/2009 | |
| DE | 202008004296 | U1 * | 9/2009 | E05B 81/06 |
| DE | 102008034649 | A1 * | 2/2010 | E05B 77/06 |
| DE | 202008016949 | U1 | 5/2010 | |
| DE | 202011004407 | U1 * | 8/2012 | E05B 77/10 |
| DE | 202012007312 | U1 | 11/2013 | |
| DE | 202013104118 | U1 | 12/2014 | |
| DE | 102014001490 | A1 | 7/2015 | |
| DE | 102014002581 | A1 | 8/2015 | |
| DE | 102015108737 | A1 | 12/2016 | |
| DE | 102012021756 | B4 * | 2/2017 | B21J 15/04 |
| DE | 102015118860 | A1 | 5/2017 | |
| DE | 102016110934 | A1 * | 12/2017 | E05B 77/02 |
| DE | 102017216742 | A1 * | 3/2019 | B29C 65/1654 |
| DE | 202019103301 | U1 * | 9/2019 | E05C 17/24 |
| EP | 0561332 | A1 * | 3/1993 | E05B 83/30 |
| EP | 0610882 | A2 * | 2/1994 | E05B 77/06 |
| EP | 1050644 | A2 * | 11/2000 | E05B 77/06 |
| EP | 1375794 | A2 * | 1/2004 | E05B 77/06 |
| EP | 1548214 | A1 * | 6/2005 | E05B 77/06 |
| EP | 3015629 | A1 * | 5/2016 | E05B 77/04 |
| FR | 2711171 | A1 * | 4/1995 | E05B 79/08 |
| GB | 2204908 | A * | 11/1988 | E05B 83/36 |
| GB | 2383077 | A * | 6/2003 | E05B 15/0245 |
| JP | 857114059 | U | 7/1982 | |
| JP | H08333937 | A | 12/1996 | |
| JP | 2001271540 | A | 10/2001 | |
| JP | 3906143 | B2 * | 4/2007 | E05B 77/38 |
| KR | 20020096892 | A * | 6/2002 | H01R 12/52 |
| KR | 20090075563 | A * | 1/2008 | E05B 79/10 |
| KR | 20140114360 | A * | 12/2012 | E05B 77/06 |
| KR | 101491312 | B1 * | 9/2013 | E05B 85/16 |
| WO | WO-2004101923 | A1 * | 11/2004 | E05B 77/10 |
| WO | WO-2010142607 | A1 * | 12/2010 | E05B 77/06 |
| WO | WO-2013093092 | A1 * | 6/2013 | E05B 7/00 |
| WO | WO-2013098323 | A1 * | 7/2013 | E05B 77/06 |
| WO | WO-2014055902 | A1 * | 4/2014 | E05B 77/06 |
| WO | WO-2015181319 | A1 * | 12/2015 | E05B 77/06 |
| WO | WO-2017162527 | A1 * | 9/2017 | E05B 17/0004 |
| WO | 2017207422 | A1 | 12/2017 | |

OTHER PUBLICATIONS

CN106869634A Espacenet machine translation description and claims Feb. 22, 2017 (Year: 2024).*
WO2017162527A1 Espacenet machine translation description and claims Sep. 28, 2017 (Year: 2024).*
Translation of International Search Report and Written Opinion issued Sep. 2, 2019, for International Patent Application No. PCT/DE2019/100568.

* cited by examiner

LOCK FOR A MOTOR VEHICLE

FIELD OF INVENTION

The invention relates to a lock for a motor vehicle, in particular a side door lock, comprising a locking mechanism having a rotary latch and at least one locking pawl, a latch, with at least one actuating lever and a release lever, wherein a blocked locking mechanism can be unblocked by means of the release lever, and a coupling element between the actuating lever and the release lever, wherein the coupling element can be actuated by means of a mass inertia element which is mounted in the motor vehicle lock.

BACKGROUND OF INVENTION

A motor vehicle door lock which is provided with a mass inertia latch is known from DE 20 2013 104 118 U1. The motor vehicle lock comprises a locking arrangement which is equipped with a control lever and a coupling element. The coupling element is designed with a spring arrangement. When the actuating lever is not actuated, the locking arrangement locks or is only unlocked under spring action when the actuating lever is actuated. If the actuation of the actuating lever results in an actuation speed which is above a predetermined threshold speed, the mass inertia of the control lever ensures that the actuation of the actuating lever is delayed.

In addition, DE 20 2012 007 312 U1 discloses a motor vehicle lock with an actuating lever and a coupling arrangement. The actuating lever interacts with the coupling arrangement in such a way that the actuating lever in question disengages the engaged coupling arrangement and leaves the disengaged coupling arrangement in the disengaged state.

If, in the event of an accident, the actuating lever is actuated at an actuation speed above a certain threshold speed, the actuating lever executes an idle stroke because of the delayed engagement of the coupling arrangement due to inertia.

An actuation system based on mass inertia for a release lever has become known from DE 10 2014 001 490 A1. The actuating lever cooperates with a coupling lever which is pivotably mounted on the release lever. A spring seated on the actuating lever engages the coupling lever and thus enables the coupling lever to be engaged when the actuating lever is actuated. In the engaged state, the locking mechanism can be unlocked by means of the release lever. In addition, a locking lever is provided, by means of which the coupling lever can be disengaged, as in the case of an accident due to inertia.

Another locking system based on mass inertia in a lock for a motor vehicle with a separate mass inertia element is known from DE 10 2014 002 581 A1. A coupling lever is mounted on an actuating lever and is spring-loaded in a position in which the coupling lever comes into engagement with the release lever when the actuating lever is actuated.

If a threshold speed for the actuation of the actuating lever is overridden, a locking lever acts on the coupling member, so that the coupling member is disengaged from the release lever. The locking lever, in turn, is spring-loaded against the release lever and can follow the movement of the actuating lever when the actuating lever is actuated at a normal actuation speed. In the event of an accident and thus an excessive speed of the actuating lever, the control lever cannot follow the movement of the actuating lever due to the mass inertia element engaged with the control lever and engages with the coupling lever. The control lever then causes the coupling lever to be deflected. The release mechanism for the lock can be locked by, for example, fixing the mass inertia element in the deflected state in which the control lever is in engagement with the coupling lever, so that the locking mechanism cannot be unlocked even if the actuating lever is actuated again.

In the case of the motor vehicle door locks based on mass inertia which are known from the prior art, the mass inertia elements are received on a metallic stepped pin. The stepped pin serves, on the one hand, to support the mass inertia element and, on the other hand, as a fastening means for the mass inertia element, wherein the stepped pin, for example, can be reshaped or riveted on one side. A metallic stepped pin offers, on the one hand, a high degree of stability in relation to the bearing point of the mass inertia element and, on the other hand, a permanent bearing point can be provided for the mass inertia element.

SUMMARY OF INVENTION

The object of the invention is to provide an improved motor vehicle lock based on the known prior art. In particular, it is the object of the invention to provide a motor vehicle lock which offers a high degree of functional reliability with regard to a mounting of the mass inertia element, is easy to assemble and functions with a small number of components. In addition, it is an object of the invention to provide a structurally simple and inexpensive option for fastening the mass inertia lever.

The object is achieved by the features of the disclosure. Advantageous embodiments of the invention are specified in the disclosure. It should be noted that the exemplary embodiments described below are not limiting; rather, any possible variations of the features described in the description are possible.

The object of the invention is achieved in that a lock for a motor vehicle, in particular a side door lock, is provided, comprising a locking mechanism having a rotary latch and at least one locking pawl, an actuating lever chain with at least one actuating lever and a release lever, wherein a blocked locking mechanism can be unblocked by the release lever, and a coupling element between the actuating lever and the release lever, wherein the coupling element can be controlled by a mass inertia element mounted in the motor vehicle lock, and wherein the mass inertia element can be mounted in the motor vehicle lock by a plastics pin. The structure of the motor vehicle lock according to the invention now makes it possible to provide a mounting for a mass inertia element which ensures a high degree of functional reliability. In particular, by using a plastics pin for the mounting, corrosion-related wear or corrosion-related impairment of the bearing point can be excluded. In addition, the plastics pin can provide a cost-effective component that can be manufactured or constructed with a high degree of flexibility. A bearing point for the mass inertia element is thus provided which, on the one hand, enables a high degree of functional reliability and, at the same time, a structurally favorable design of a mounting for the mass inertia element. As a further advantage, when choosing the material plastic for the bearing pin, a low thermal conductivity and a low weight can be used, which in turn has an advantageous effect on the functionality and weight of the motor vehicle lock.

In a lock for a motor vehicle, which is also called a locking system, locking mechanisms are installed which consist of a rotary latch and at least one locking pawl. The locking mechanism in the lock interacts with a lock holder that is either attached to the body of the motor vehicle or to the door, flap, sliding door, etc. The relative movement between the lock holder and the rotary latch causes the rotary latch to be pivoted and at the same time the locking pawl comes into engagement with the rotary latch. There are locking mechanisms with pre-detent and main detent which are widely known from the prior art.

Depending on the embodiment, there are one- or two-stage locking mechanisms, which then have a pre-detent and/or a main detent. The locking pawl is preferably brought into engagement with the rotary latch by spring-loading. A release lever is used to unlock, that is, to release the locking pawl from the rotary latch. The release lever acts on the locking pawl in such a way that the locking pawl disengages from the rotary latch and the rotary latch can move from the detent position into an open position. The rotary latch is mostly moved by means of a spring element and/or due to a tensile load resulting from the lock holder in combination with the door seal.

An actuating lever chain with at least one actuating lever is used to actuate the release lever. The actuating lever can be, for example, an internal actuating lever or an external actuating lever. With the help of the actuating lever, the release lever is moved and the locking mechanism is unblocked. According to the invention, a coupling element is arranged between the actuating lever and the release lever. The coupling element is able to decouple the actuating lever chain, that is to say the actuating chain between, for example, the internal door handle, the internal actuating lever and the release lever. The decoupling of the actuating lever chain is controlled by means of the mass inertia element. The control takes place via an impulse. This impulse can result, for example, from a collision of the motor vehicle. An external actuating lever, for example, can be moved by an impulse from the collision, which in turn sets the actuating lever chain in motion. The mass inertia element counteracts this impulse and prevents the release lever from being actuated. The impulse is used to control the coupling element in such a way that the actuating lever chain is interrupted. The actuating lever chain is preferably engaged when the motor vehicle lock is not actuated, wherein the coupling is disengaged in the event of an impulse on the motor vehicle.

In one embodiment variant of the invention, the plastics pin extends through at least part of the housing, wherein in particular the part that extends through the housing can be connected to the housing by means of reshaping. The housing of the motor vehicle lock is preferably made of plastic. In addition, the housing can be at least partially enclosed by a lock plate or a lock case, the lock case or the lock plate preferably being made of sheet steel. The plastics pin protrudes through the housing and/or the lock plate or the lock case. The plastics pin extends so far through the housing or the lock case or the lock plate that the plastics pin can be fastened to the motor vehicle lock. The plastics pin can advantageously be connected to the motor vehicle lock by means of reshaping. The plastics pin can, for example, have a cylindrical design and extend through a bore and/or a sleeve of the housing, so that additional stabilization of the mounting of the mass inertia element is possible.

If the reshaping can be carried out by means of an ultrasound process, this results in an advantageous embodiment variant of the invention. The part of the plastics pin that extends through the housing or protrudes from the housing can be reshaped by means of an ultrasound process so that a permanent connection results, for example in the form of a rivet head. In addition, the housing can have, for example, a run-in chamfer or bevel into which at least part of the reshaped plastic of the plastics pin can be deformed, so that an additional securing device can be provided for the plastics pin. The reshaping by means of an ultrasound process or ultrasonic riveting offers the advantage of high process reliability and a cost-effective assembly method to achieve a bearing point for the mass inertia element.

If the plastics pin has at least one joining surface, in particular a joining surface for receiving the mass inertia element, a further embodiment variant of the invention results. The installation space in a motor vehicle lock is limited, so it can happen that the mass inertia element is arranged in the motor vehicle lock parallel to other components, such as levers, gears or slides. In this case, spacer disks, guide disks or distance pieces are necessary in order to be able to ensure that the components of the motor vehicle lock can be actuated safely. According to the invention, the plastics pin can have at least one joining surface that can simultaneously fulfill several functions. On the one hand, the joining surface can be used for secure positioning of the mass inertia element, so that alignment and positional stabilization of the mass inertia element in the motor vehicle lock can be made possible. In addition, the joining surface can be dimensioned or designed to be so large that the joining surface can simultaneously serve for guiding, stabilizing or guiding further components in the motor vehicle lock. In an advantageous manner, the joining surface can be integrally formed on the plastics pin. The joining surface can also serve as a stop surface for the plastics pin or the bearing element for the mass inertia element, for example in the case in which the plastics pin extends in some areas through a bore and/or opening and/or sleeve of the housing the joining surface can simultaneously serve as a stop surface and/or counter-bearing for reshaping the part of the plastics pin that extends through the housing.

In a further embodiment of the invention, there is an advantage if the plastics pin can be connected to the mass inertia element in a force-fitting, form-fitting or material-fitting manner. If, on the one hand, the advantages described above for fitting the plastics pin in the motor vehicle lock result, then the plastics pin can simultaneously serve to fasten the mass inertia element in the motor vehicle lock. Thus, the plastics pin not only has the task of supporting the mass inertia element, the plastics pin can simultaneously also serve for positioning, fixing and/or stabilizing the mass inertia element in the motor vehicle lock. Depending on the embodiment of the stepped pin, it is conceivable that the plastics pin serves exclusively as a bearing point for the mass inertia element, so that the mass inertia element moves relative to the plastics pin and, on the other hand, it is also conceivable that the plastics pin is firmly connected to the mass inertia element so that the plastics pin moves with a deflection or pivoting of the mass inertia element. Depending on the embodiment of the motor vehicle lock, it can be advantageous to connect the plastics pin to the mass inertia element in a force-fitting manner, for example by means of a screw connection, in a material-fitting manner, for example, in the form of a screw connection and/or in a material-fitting manner, for example in the form of an adhesion process. Of course, combined fitting and/or combined holding of the mass inertia element on the plastics pin is also conceivable according to the invention.

In a further embodiment variant, the mass inertia element has at least one recess cooperating with the plastics pin. In an advantageous manner, the mass inertia element can be adapted to the shape of the plastics pin. This is advantageous, for example, if a form fit is to be established between the mass inertia element and the plastics pin. A reliable transmission of a torque can be made possible by a form-fitting engagement between the plastics pin and the mass inertia element. In addition, a cooperating recess between the mass inertia element and the plastics pin can serve as an assembly lock for the mass inertia element, namely when the mass inertia element has only one installation position due to its design, so that incorrect assembly can be prevented.

The plastics pin can advantageously be passed through the mass inertia element. If the plastics pin is passed through the mass inertia lever, bearing security of the mass inertia element can in turn be provided, and at the same time the plastics pin can serve, for example, for further mounting in, for example, a housing cover. It is of course also conceivable that the plastics pin extends through the housing on both sides of the housing of the motor vehicle lock, so that the plastics pin, for example, provides an opportunity to connect the motor vehicle lock housing, in particular a housing cover, to a housing base. The housing can preferably be detachably connected by means of the plastics pin.

In a further embodiment variant of the invention, the plastics pin can be locked with the mass inertia element, in particular in the form of a bayonet catch. If the plastics pin extends at least partially through at least one but also possibly two, three or more recesses in the mass inertia element through the mass inertia element, on the one hand an assembly securing means can be provided and at the same time it is possible that, after joining of the mass inertia element on the plastics pin and rotation of the mass inertia element, securing of the mass inertia element on the plastics pin is possible. The form-fitting connection and, in particular, the connection by means of a bayonet-like closure enables a safe, fast, cost-effective and safe connection of the mass inertia element and the plastics pin. By means of a form-fitting closure, in particular a bayonet-like closure, it is possible to hold the mass inertia element securely and to ensure that the mass inertia element functions reliably in the pivoting range of the mass inertia element. A bayonet-like closure is used for this, in which the mass inertia element can first be connected to the plastics pin, and in which the mass inertia element receives a secure bearing point after the plastics pin has been inserted into the lock housing. In an advantageous manner, the plastics pin can also have a joining aid with respect to the lock housing, so that positioning security can also be achieved with respect to the insertion of the plastics pin into the housing. Thus, a joining securing means for the mass inertia element, in particular in the form of a bayonet catch, and a joining aid in relation to the housing of the motor vehicle lock can be produced or supplemented in an advantageous manner.

If the mass inertia element is made at least partially from a plastics material, a further advantageous embodiment variant of the invention results. Manufacturing the mass inertia element from a composite material made of plastics and iron, for example, has the advantage that sufficient mass can be provided in the mass inertia element and, on the other hand, that plastics parts of the mass inertia element are available for abutment on the plastics pin. In addition, the production of the mass inertia element from a composite material offers the advantage that corrosion or an oxygen reduction on the surface of the mass inertia element can be prevented. Impurities and/or damage to the mass inertia element can affect the mounting on the plastics pin and can affect the functionality of the mass inertia element. The construction of a plastics pin according to the invention in combination with a mass inertia element made at least partially from plastics provides a combination of materials which can function at least for the most part independently of negative metallic influences.

In a further embodiment variant of the invention, there is an advantage when the plastics pin is designed in one piece, in particular as a one-piece plastics injection molded part. The one-piece construction of the plastics pin and in particular the production as a plastics injection molded part offers a high degree of design freedom and at the same time the possibility of assigning the plastics pin to a further function. By means of a one-piece construction of the plastics pin, it is possible, for example, to implement water splash-proofing in relation to the fastening of the bearing pin. If, for example, moisture reaches the part of the plastics pin that is connected to the housing, the introduction of moisture into the bearing area of the mass inertia element can be prevented by an integrally connected joining surface. The plastics pin thus simultaneously has the function of a seal with respect to the bearing point of the mass inertia element. The design variants shown enable a high degree of functional reliability with a simultaneous reduction in the number of components and the advantage of high design freedom and a light construction of the motor vehicle lock.

If the plastics pin has a joining surface and the joining surface can be designed in such a way that a spring bias can be introduced into the mass inertia element, this results in a further embodiment variant of the invention. The mass inertia element is preferably connected to the plastics pin by means of a bayonet catch. In terms of production but also function, tolerances between the stepped pin and the mass inertia element can be provided and/or are absolutely necessary, since the mass inertia element moves relative to the plastics pin in the lock or locking system. A production-related play between the mass inertia element and the recess in the plastics pin is approximately 0.5 mm. By applying a spring bias to the mass inertia element according to the invention, an unintentional movement of the mass inertia element can be prevented with regard to the manufacturing tolerance. In this way, noises such as, for example, rattling can be suppressed in an advantageous manner.

In a further embodiment variant, the spring bias can be introduced into the mass inertia element by means of at least one bracket molded into the joining surface, in particular by means of two, three or more brackets. The integration of spring elements in the joining surface offers the advantage that the mass inertia element can be safely mounted in the locking system with the smallest possible number of components. The plastics pin and in particular the joining surface formed on the plastics pin can have integrally molded brackets which, in the course of production, protrude beyond the surface of the joining surface directed toward the mass inertia element. In this way, a spring bias can be transmitted to the mass inertia element in a simple manner and through the movability of the brackets. In other words, the brackets protrude at least in some areas beyond the joining surface, so that the brackets are deformed when the mass inertia element is mounted on the plastics pin.

The deformation of the brackets formed integrally on the plastics pin then causes a spring bias in the direction of the mass inertia element.

Advantageously, at least two brackets formed symmetrically into the joining surface can be provided. A symmetrical arrangement of the brackets offers the advantage of uniform force transmission or introduction of a spring bias onto the mass inertia element. If the mass inertia element is connected to the plastics pin by means of a bayonet catch, the plastics pin has arms which cooperate with recesses in the mass inertia element. The brackets can preferably match the arms of the plastics pin at least in their alignment, so that a spring bias can be achieved in the direction of the arms and in a targeted manner in the direction of the extension of the arms on the plastics pin. A symmetrical arrangement is only advantageous if the mass inertia element has corresponding geometries.

Thus, it may also be advantageous to adjust the alignment and number of brackets in the joining surface with respect to the geometric design of the mass inertia element and in particular the masses of the mass inertia element, or to construct the relevant number thereof. A spring force can thus be exerted in a suitable manner on the corresponding mass of the mass inertia element. The mass inertia element is advantageously mass-balanced with respect to a central axis of the plastics pin. This means that the center of gravity of the mass inertia element coincides with the central axis of the plastics pin. In this embodiment in particular, a symmetrical arrangement of the brackets in the joining surface can be advantageous.

If the brackets extend radially outward in the joining surface from a central axis of the stepped pin, this results in a further embodiment variant of the invention. The introduction of a spring bias into the mass inertia element can advantageously be initiated on the radially outer circumference of the joining surface. This has the advantage that the greatest possible lever torque is available for introduction into the mass inertia element. “Lever element” here means that, starting from a central axis of the stepped pin, the brackets are designed in such a way that they extend radially outward starting from the central axis, so that a lever arm can be formed radially outward starting from the central axis.

In a further embodiment variant of the invention, the brackets have a radius at least in the region of a contact surface on the mass inertia element, and in particular the contact surfaces can be designed spherically so that a contact surface that is as reducible as possible, in particular a point contact between the brackets and the inertia element, can be produced. On the one hand, the spring bias can prevent undesired movement of the mass inertia element but, on the other hand, the spring bias counteracts a movement of the mass inertia element relative to the plastics pin. By designing the contact surface of the bracket on the mass inertia element in line or point form, the force to be introduced into the inertia element can be designed in such a way that the necessary force can be transmitted, but the frictional forces between the bracket and the inertia element can be reduced to a minimum. Through the design of the brackets according to the invention for introducing a spring bias on the mass inertia element there is a further means for achieving high functional reliability with a small number of components which thus can be manufactured or provided inexpensively.

BRIEF DESCRIPTION OF DRAWINGS

In the following, the invention is explained in more detail with reference to the attached drawings using a preferred exemplary embodiment. However, the principle applies that the exemplary embodiments do not limit the invention, but are merely embodiments. The features shown can be implemented individually or in combination with further features of the description.

In the drawings.

DETAILED DESCRIPTION

Figure 1:
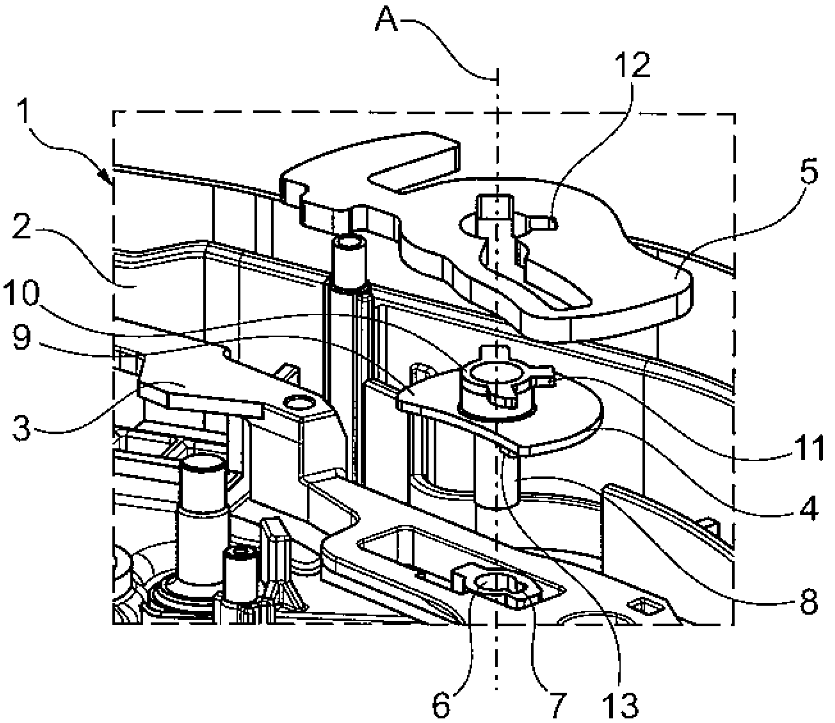
FIG. 1 is a three-dimensional view of a motor vehicle lock with a slide, a plastics pin and a mass inertia element.

In FIG. 1, a motor vehicle lock 1 is shown in a three-dimensional representation and with only some of the components of the motor vehicle lock 1. The other components of the motor vehicle lock 1 are dispensed with due to the better clarification of the inventive concept. A housing 2, a sliding element 3, a plastics pin 4 and a mass inertia element 5 are shown in FIG. 1. The mass inertia element 5 is fastened on the plastics pin 4 along an axis A, wherein the plastics pin 4 can be inserted into an opening 6 of the housing 2. An extension of the opening 7 can be seen in the opening 6, so that the plastics pin 4 can be inserted into the opening 6 in a form-fitting manner. In this exemplary embodiment, the plastics pin 4 can thus be received so that it cannot rotate in the motor vehicle lock 1.

The plastics pin 4 has a cylindrical extension 8 which extends through the housing 2. A joining surface 9 serves, on the one hand, as a counter-bearing for, for example, riveting of the cylindrical extension 8 and, on the other hand, as a guide surface for the sliding element 3. In addition, the joining surface 9 has the task of safely guiding the mass inertia element 5 around the axis H during a pivoting movement. In this exemplary embodiment, the joining surface 9 is formed in one piece and as a plastic injection molded part with the plastics pin 4. The plastics pin 4 has an extension 10 which extends through the mass inertia element 5. Starting from the extension extending through the mass inertia element 5, the plastics pin 4 has arms which, starting from the plastics pin 4, extend outward. The arms 11 in this exemplary embodiment 3 cooperate with recesses 12 in the mass inertia element 5, so that the arms 11 can be guided through the recesses 12 in the mass inertia element 5.

For an assembly of the inertia element 5, the plastics pin 4 is passed with its arms 11 through the recesses 12 of the mass inertia element 5 and then the inertia element 5 undergoes a rotation, wherein the rotation of the inertia element 5 in relation to the plastics pin 4 is designed in such a way that the mass inertia element 5 can move freely without the arms 11 coming into alignment with the recesses 12, so that reliable functioning and holding of the mass inertia element 5 can be realized. In this exemplary embodiment, a bayonet-like closure is implemented between the plastics pin 4 and the mass inertia element 5. After the mass inertia element 5 has been joined to the plastics pin 4 and the plastics pin 4 has been inserted into the opening 6, 7 of the housing 2, the plastics pin 4 is received so that it cannot rotate in the housing. For this purpose, a thickened portion 13 extends into the extension 7 of the opening 6.

Figure 2:
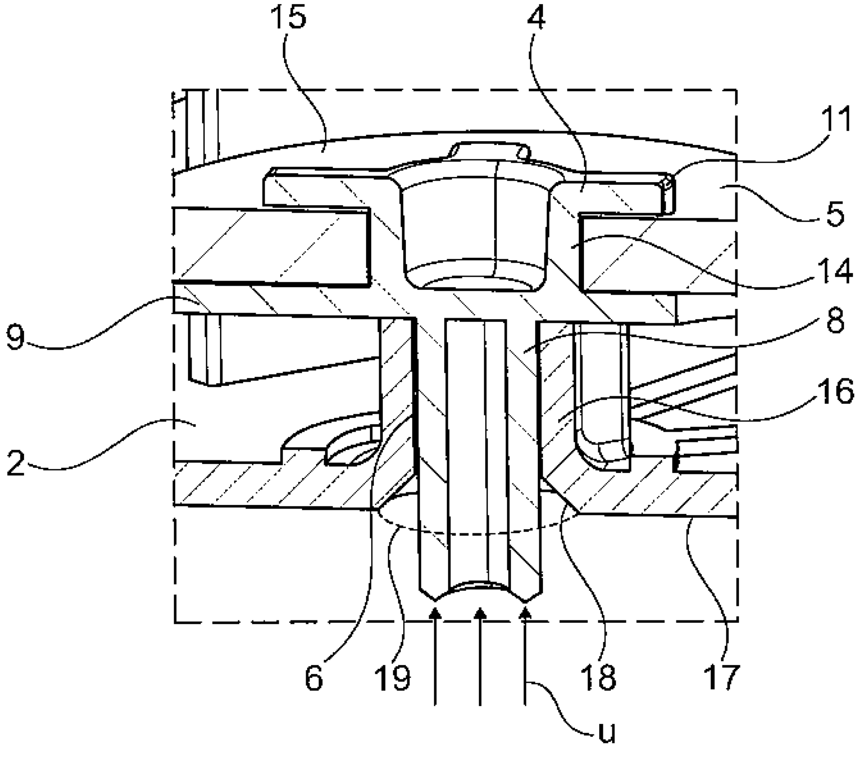
FIG. 2 is a view of a mass inertia element mounted on a plastics pin in a section through a housing of a motor vehicle lock.

In FIG. 2, the assembled mass inertia element 5 is shown in an assembled position in the housing 2 on a stepped pin 4. The stepped pin 4 here forms a bearing surface 14 for the mass inertia element 5, wherein the plastics pin 4 is held securely in position in the opening 6 or the opening 6 and the extension 7. The arms 11 of the plastics pin 4 extend over the surface 15 of the mass inertia element 5 and thus hold the mass inertia element 5 in an aligned position in the motor vehicle lock 1. In this case, the mass inertia element 5 is held in the motor vehicle lock 1 in a pivotable manner between the arms 11 and the joining surface 9.

Starting from the joining surface 9, the plastics pin 4 extends by means of its cylindrical extension 8 through a sleeve-like protuberance 16 of the housing 2 and protrudes beyond the end 17 of the housing 2. The opening 6 is provided at the end of the housing 17 with bevels 18 which can serve to receive the deformed part of the cylindrical extension. If the cylindrical extension 8, and in particular the part of the cylindrical extension 8 protruding beyond the end 17 of the housing 2, is acted upon, for example by means of an ultrasound process U, a reshaping can take place that is inserted into the opening 6 or the bevel 18 like a rivet head 19. The rivet head 19 is shown by means of a dashed line in FIG. 2. By reshaping of the cylindrical extension 8, a permanent connection between the plastics pin 4 and the housing 2 can be established. The mass inertia element 5 is thus given a secure bearing point that can be produced from a plastics pin.

Figure 3:
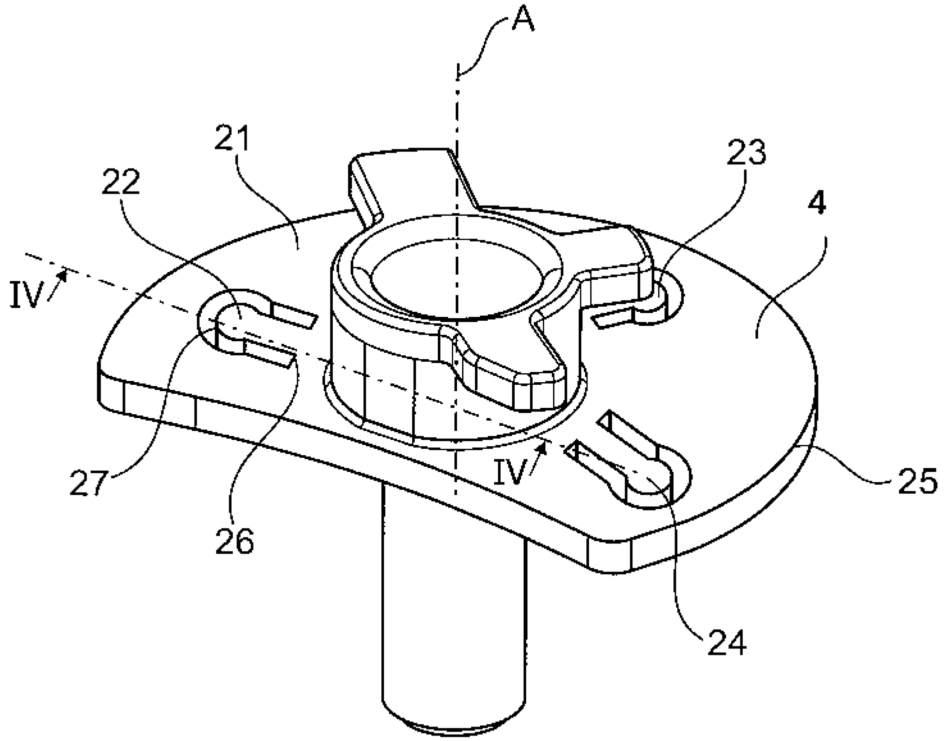
FIG. 3 is a three-dimensional view of a plastics pin with brackets molded therein for introducing a spring bias on the mass inertia element and FIG. 4 is a sectional view along the line IV-IV from FIG. 3 in an assembled state with a housing and a mass inertia element.

FIG. 3 shows a further exemplary embodiment of a plastics pin with brackets 22, 23, 24 molded into a joining surface 21. The brackets 22, 23, 24 are designed as integral components of the plastics pin 20. The brackets 22, 23, 24 extend radially outward from a central axis A of the plastics pin 20. The brackets 22, 23, 24 are designed in such a way that the brackets 22, 23, 24 protrude beyond a surface 25 of the joining surface 21 if the inertia element 5 is not yet connected to the plastics pin 20 or the mass inertia element is not yet mounted on the plastics pin 20.

The brackets 22, 23, 24 are freely movable, that is, starting from a connection surface 26, the brackets 22, 23, 24 extend radially outward, wherein the radially outer ends 27 rest resiliently against the mass inertia element 5. In this exemplary embodiment, three brackets 22, 23, 24 are molded into the joining surface 21; it is of course also conceivable to provide further brackets 22, 23, 24 depending on the design of the mass inertia element 5 and the required spring bias in the plastics pin 20.

Figure 4:
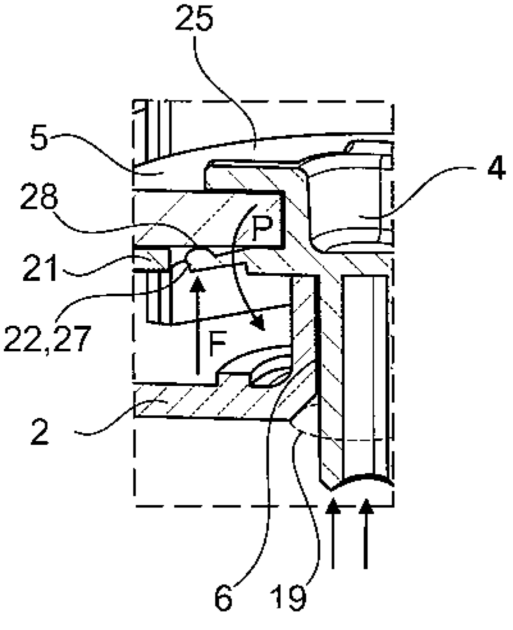

FIG. 4 shows a section along a line IV-IV from FIG. 3 in a three-dimensional view. FIG. 4 shows the plastics pin 20 with a mass inertia element 5 mounted in a housing 2. The same components are provided with the same reference signs in accordance with the preceding figures. The plastics pin 20 has a bracket 22, which introduces a force F as a spring bias into the mass inertia element 5. As can be seen in FIG. 4, the bracket 22 has been pivoted in the direction of the arrow P during the assembly of the mass inertia element 5, so that a spring bias F is established in the bracket 22, and exerts a spring bias on the mass inertia element 5.

It can also be clearly seen that the bracket 22 in this embodiment has a spherical contact surface 28. That is, the bracket 22 is formed spherically at its radially outer end 27 at least in the direction of the mass inertia element 5, so that there is point contact between the bracket 22 and the mass inertia element 5. In the case of a relative movement between the mass inertia element 5 and the plastics pin 20, there is thus a minimal friction surface and thus sliding friction.

LIST OF REFERENCE SIGNS

1 motor vehicle lock
2 housing
3 sliding element
4, 20 plastic mandrel
5 mass inertia element
6 opening
7 extension
8 cylindrical extension
9, 21 joining surface
10 extension
11 arm
12 recess
13 thickened portion
14 bearing surface
15, 25 surface
16 extension
17 end of the housing
18 bevel
19 rivet head
22, 23, 24 bracket
26 connection surface
27 radially outer ends
28 contact surface
A axis
U ultrasound
F force, spring bias.

The invention claimed is:

1. A lock for a motor vehicle, the lock comprising:
a housing,
an actuating lever chain with at least one actuating lever, wherein the actuating lever chain is configured to unblock a locking mechanism of the motor vehicle from a blocked position,
a mass inertia element which is mounted in the lock, and
a plastic pin that is engageable between the actuating lever and the mass inertia element, wherein the mass inertia element is mounted in the motor vehicle lock via the plastic pin,
wherein:
the plastic pin includes a cylindrical extension,
a portion of the cylindrical extension extends through a wall of the housing and out of the housing,
in a first configuration, the portion of the cylindrical extension is a first shape,
the first shape is cylindrical and is movable with respect to the wall of the housing to move into and out of the housing,
the plastic pin is modified from the first configuration to a second configuration, and in the second configuration, the portion of the cylindrical extension is a second shape to fasten the plastic pin to an exterior of the housing to prevent movement of the cylindrical extension with respect to the housing,
the exterior surface of the housing includes a bevel,
the second shape is a rivet head shape that engages with the bevel,
the plastic pin has a joining surface for receiving the mass inertia element, and
the housing includes a cylindrical protuberance and the cylindrical extension is configured to extend through the protuberance in the first and second configuration, wherein a first side of the joining surface engages the protuberance to act as a stop surface to prevent further extension of the cylindrical extension out of the housing, and wherein the mass inertia element is mounted on a second side of the joining surface, wherein the first side is opposite the second side.

2. The lock for the motor vehicle according to claim 1, wherein the portion of the cylindrical extension that extends through the housing is reshaped by ultrasonically welding.

3. The lock for the motor vehicle according to claim 1, wherein the plastic pin is connected to the mass inertia element in a force-fitting, form-fitting or material-fitting manner.

4. The lock for the motor vehicle according to claim 1, wherein the mass inertia element has at least one recess corresponding to the plastic pin.

5. The lock for the motor vehicle according to claim 1, wherein the plastic pin passes through the mass inertia element.

6. The lock for the motor vehicle according to claim 1, wherein the plastic pin is locked with the mass inertia element via a bayonet catch.

7. The lock for the motor vehicle according to claim 1, wherein the mass inertia element is at least partially made from a plastic material.

8. The lock for the motor vehicle according to claim 1, wherein the plastic pin is formed as one piece as a one-piece plastic injection molded part.

9. The lock for the motor vehicle according to claim 1, wherein the joining surface is configured so that a spring bias is introduced into the mass inertia element.

10. The lock for the motor vehicle according to claim 9, wherein the spring bias is introduced into the mass inertia element by at least one bracket formed in the joining surface.

11. The lock for the motor vehicle according to claim 10, wherein the at least one bracket includes at least two brackets that are inserted symmetrically into the joining surface.

12. The lock for the motor vehicle according to claim 10, wherein the at least one bracket extends radially outward in the joining surface starting from a central axis.

13. The lock for the motor vehicle according to claim 10, wherein the at least one bracket has a radius at least in a region of a contact surface on the mass inertia element.

14. The lock for the motor vehicle according to claim 13, wherein the at least one bracket is configured to have a spherical shape to reduce an area of the contact surface.

15. The lock for the motor vehicle according to claim 13, wherein the region of the contact surface is formed as a line or point contact between the at least one bracket and the mass inertia element.

16. The lock for the motor vehicle according to claim 1, wherein the plastic pin has a thickened portion that extends into an extension of an opening in the housing.

17. The lock for the motor vehicle according to claim 1, wherein the housing includes a lower portion and an upper portion opposite the lower portion, wherein a first portion of the cylindrical extension extends through the lower portion of the housing in the first configuration, and wherein a second portion of the cylindrical extension extends through the upper portion of the housing in the first configuration.

18. A lock for a motor vehicle, the lock comprising:

a housing, an actuating lever chain with at least one actuating lever, wherein the actuating lever chain is configured to unblock a locking mechanism of the motor vehicle from a blocked position, a mass inertia element which is mounted in the lock, and a plastic pin that is engageable between the actuating lever and the mass inertia element, wherein the mass inertia element is mounted in the motor vehicle lock via the plastic pin, wherein:

the plastic pin includes a cylindrical extension, a portion of the cylindrical extension extends through a wall of the housing and out of the housing, in a first configuration, the portion of the cylindrical extension is a first shape, the first shape is cylindrical and is movable with respect to the wall of the housing to move into and out of the housing, the plastic pin is modified from the first configuration to a second configuration, and in the second configuration, the portion of the cylindrical extension is a second shape to fasten the plastic pin to an exterior of the housing to prevent movement of the cylindrical extension with respect to the housing, the exterior surface of the housing includes a bevel, the second shape is a rivet head shape that engages with the bevel, the plastic pin has a joining surface, wherein the joining surface is configured so that a spring bias is introduced into the mass inertia element, and the spring bias is introduced into the mass inertia element by at least one bracket formed in the joining surface.

* * * * *